(12) United States Patent
Shi et al.

(10) Patent No.: US 10,020,757 B2
(45) Date of Patent: Jul. 10, 2018

(54) INVERTER, CONTROL APPARATUS THEREOF, METHOD FOR CONTROLLING SAME, AND INVERTER SYSTEM

(71) Applicant: Huawei Technologies Co., Ltd., Shenzhen (CN)

(72) Inventors: Yong Shi, Shenzhen (CN); Lei Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/383,664

(22) Filed: Dec. 19, 2016

(65) Prior Publication Data

US 2017/0099015 A1    Apr. 6, 2017

Related U.S. Application Data

(63) Continuation of application No. PCT/CN2015/081573, filed on Jun. 16, 2015.

(30) Foreign Application Priority Data

Jun. 20, 2014   (CN) .......................... 2014 1 0281393

(51) Int. Cl.
*H02M 7/53* (2006.01)
*H02M 7/539* (2006.01)
(Continued)

(52) U.S. Cl.
CPC ............. *H02M 7/539* (2013.01); *H02J 3/383* (2013.01); *H02M 1/32* (2013.01); *H02M 1/36* (2013.01);
(Continued)

(58) Field of Classification Search
CPC ...................................................... H02M 7/53
See application file for complete search history.

(56) References Cited

U.S. PATENT DOCUMENTS 4,005,350 A    1/1977  Brenneisen
5,914,590 A *  6/1999  Wacknov ............ H02M 3/1563
                                              323/282
(Continued)

FOREIGN PATENT DOCUMENTS

CN       1533019 A       9/2004
CN     101749635 A       6/2010
(Continued)

OTHER PUBLICATIONS

Machine Translation and Abstract of Chinese Publication No. CN1533019, Sep. 29, 2004, 8 pages.
(Continued)

*Primary Examiner* — Kyle J Moody
*Assistant Examiner* — Trinh Q Dang
(74) *Attorney, Agent, or Firm* — Conley Rose, P.C.

(57) ABSTRACT

A method for controlling an inverter including, when it is detected that a voltage across a bus capacitor, for example, a bus voltage, is excessively large, controlling a photovoltaic (PV) battery to short-circuit so that the bus voltage drops. When the bus voltage drops to a particular value, continuing charging, by the PV battery, the bus capacitor to control the bus voltage to rise so that the bus voltage is kept within an operating voltage range of the inverter and the inverter can be equipped with a PV battery having a higher open circuit voltage. Therefore, a charging rate of the bus capacitor can be increased and a startup speed of the inverter can be increased.

9 Claims, 8 Drawing Sheets

(51) Int. Cl.
*H02M 1/32* (2007.01)
*H02M 1/36* (2007.01)
*H02M 7/48* (2007.01)
*H02J 3/38* (2006.01)

(52) U.S. Cl.
CPC .............. *H02M 7/48* (2013.01); *H02M 7/53* (2013.01); *Y02E 10/56* (2013.01)

(56) References Cited

U.S. PATENT DOCUMENTS

| | | |
|---|---|---|
| 2010/0327659 A1 | 12/2010 | Lisi et al. |
| 2011/0194216 A1 | 8/2011 | Schaub et al. |
| 2015/0076916 A1 | 3/2015 | Cheng et al. |

FOREIGN PATENT DOCUMENTS

| | | |
|---|---|---|
| CN | 101807850 A | 8/2010 |
| CN | 101931215 A | 12/2010 |
| CN | 102171906 A | 8/2011 |
| CN | 102570787 A | 7/2012 |
| CN | 103312140 A | 9/2013 |
| CN | 103337901 A | 10/2013 |
| CN | 103780071 A | 5/2014 |
| EP | 2259419 A1 | 12/2010 |

OTHER PUBLICATIONS

Foreign Communication From a Counterpart Application, European Application No. 15810078.4, Extended European Search Report dated May 29, 2017, 4 pages.
Foreign Communication From a Counterpart Application, PCT Application No. PCT/CN2015/081573, English Translation of International Search Report dated Aug. 26, 2015, 2 pages.
Foreign Communication From a Counterpart Application, PCT Application No. PCT/CN2015/081573, English Translation of Written Opinion dated Aug. 26, 2015, 6 pages.
Machine Translation and Abstract of Chinese Publication No. CN101749635, Jun. 23, 2010, 7 pages.
Machine Translation and Abstract of Chinese Publication No. CN101807850, Aug. 18, 2010, 6 pages.
Machine Translation and Abstract of Chinese Publication No. CN102570787, Jul. 11, 2012, 8 pages.
Foreign Communication From a Counterpart Application, Chinese Application No. 201410281393.8, Chinese Office Action dated Aug. 3, 2017, 5 pages.

* cited by examiner

INVERTER, CONTROL APPARATUS THEREOF, METHOD FOR CONTROLLING SAME, AND INVERTER SYSTEM

CROSS-REFERENCE TO RELATED APPLICATIONS

This application is a continuation of International Application No. PCT/CN2015/081573, filed on Jun. 16, 2015, which claims priority to Chinese Patent Application No. 201410281393.8, filed on Jun. 20, 2014, both of which are hereby incorporated by reference in their entireties.

TECHNICAL FIELD

The present disclosure relates to the field of inverters, and in particular, to an inverter, a control apparatus thereof, a method for controlling same, and an inverter system.

BACKGROUND

A photo-voltaic (PV) battery directly converts solar energy into electric energy. The PV battery is widely applied because of advantages such as that the PV battery is not limited by resource distribution areas, electricity can be generated near a location at which electricity is used, a time taken to obtain energy is short, and energy quality is high.

A PV inverter (an inverter for short below) is an inverter that is powered by a PV battery. A main function of the inverter is to convert a direct current of a PV battery into an alternating current. The PV battery supplies power to the inverter in a form of charging a bus capacitor, and a voltage across the bus capacitor is a bus voltage, for example, the bus voltage may be used to supply power to an auxiliary power supply circuit of the inverter and an inverter circuit of the inverter, where the auxiliary power supply circuit may supply auxiliary power to components, for example, the inverter circuit, of the inverter. At the moment when the PV battery is connected to the inverter, the auxiliary power supply circuit of the inverter is not started up yet. In this case, the PV battery charges the bus capacitor in a form of an approximate constant current source. When the bus voltage reaches a startup voltage of the auxiliary power supply circuit, the auxiliary power supply circuit is started up. In this process, the PV battery continuously charges the bus capacitor until the bus voltage rises to an open circuit voltage of the PV battery (however, because there is a slight loss on the inverter, the PV battery generally stops charging when the bus voltage rises slightly less than the open circuit voltage of the PV battery). It can be known that the bus voltage is associated with the open circuit voltage of the PV battery.

Low-voltage components are included inside the inverter. To prevent the low-voltage components from getting burnt out, an operating voltage of the inverter should not be excessively large, for example, the bus voltage should not be excessively large and further the open circuit voltage of the PV battery should not be excessively large either. The open circuit voltage of the PV battery is limited and a charging speed of the bus capacitor is limited. As a result, the auxiliary power supply circuit of the inverter and the inverter circuit of the inverter need a relatively long time to be started up. Therefore, a startup speed of the inverter is relatively slow.

SUMMARY

Embodiments of the present disclosure provide an inverter, a control apparatus thereof, a method for controlling same, and an inverter system so as to increase a startup speed of the inverter.

According to a first aspect, the present disclosure provides a control apparatus applied to an inverter, where the control apparatus may include an overvoltage protection circuit and a detection circuit. The detection circuit is configured to detect a bus voltage of the inverter and input the detected bus voltage to the overvoltage protection circuit, where the bus voltage refers to a voltage across a bus capacitor, the bus voltage is used to supply power to an auxiliary power supply circuit of the inverter and an inverter circuit of the inverter, the auxiliary power supply circuit is configured to supply auxiliary power to the inverter circuit, and the bus capacitor is powered by a PV battery. The overvoltage protection circuit is configured to receive the bus voltage input by the detection circuit, when the bus voltage is greater than or equal to a first threshold, control the PV battery to short-circuit so that the PV battery stops supplying power to the bus capacitor to make the bus voltage drop, and when the bus voltage drops to a second threshold, stop controlling the PV battery to short-circuit so that the PV battery continues to supply power to the bus capacitor to make the bus voltage rise, where the first threshold is greater than the second threshold, the first threshold is less than or equal to a maximum operating voltage that is allowed by an internal component of the inverter, and the second threshold is greater than or equal to a minimum operating voltage of the auxiliary power supply circuit.

In a first possible implementation manner of the first aspect, the overvoltage protection circuit includes a switch Q1 and a control unit, where a first connection end and a second connection end of Q1 are respectively connected to two ends of the PV battery, and a third connection end of Q1 is connected to the control unit, and the control unit is configured to receive the bus voltage input by the detection circuit, when the bus voltage is greater than or equal to the first threshold, control Q1 to be closed so as to control the PV battery to short-circuit so that the PV battery stops supplying power to the bus capacitor, to make the bus voltage drop, and when the bus voltage drops to the second threshold, control Q1 to be opened so as to stop controlling the PV battery to short-circuit so that the PV battery continues to supply power to the bus capacitor to make the bus voltage rise.

With reference to the first possible implementation manner of the first aspect, in a second possible implementation manner, the overvoltage protection circuit further includes a diode D1, where a positive end of D1 is connected to Q1, a negative end of D1 is connected to a positive end of the bus capacitor, and D1 is configured to, when Q1 is closed, prevent Q1 from short-circuiting the bus capacitor.

With reference to the second possible implementation manner of the first aspect, in a third possible implementation manner, the overvoltage protection circuit further includes an inductor L1, where L1 and Q1 are connected in series and are connected to the two ends of the PV battery, and L1 is configured to, when Q1 is closed, limit a rise rate of the bus voltage, and the positive end of D1 is connected to a common connection point between L1 and Q1 and the negative end of D1 is connected to the positive end of the bus capacitor.

With reference to the first possible implementation manner of the first aspect, in a second possible implementation manner, the overvoltage protection circuit further includes a diode D2, an inductor L2, and a resistor R, where L2 and Q1 are connected in series and are connected to the two ends of the PV battery, R is connected in parallel to L2, a positive end of D2 is connected to a common connection point between R and L2, and a negative end of D2 is connected to a positive end of the bus capacitor. D2 is configured to, when Q1 is closed, prevent Q1 from short-circuiting the bus capacitor. L2 is configured to, when Q1 is closed, limit a rise rate of the bus voltage. R is configured to, when Q1 is opened, absorb energy stored in L2.

With reference to the first aspect or any one of the first to the fourth possible implementation manners of the first aspect, in a fifth possible implementation manner, the control apparatus may further include an instantaneous startup circuit, where the instantaneous startup circuit includes a startup detection circuit, a current source circuit, and a current source turn-off circuit, where the startup detection circuit is configured to detect the bus voltage of the inverter, and input the bus voltage to the current source circuit, the current source circuit is configured to receive the bus voltage input by the startup detection circuit, and when the bus voltage is greater than or equal to a third threshold, start the current source circuit so that the current source circuit charges an internal chip of the auxiliary power supply circuit, to reach an operating voltage of the internal chip of the auxiliary power supply circuit, to further start up the auxiliary power supply circuit, where the third threshold is greater than or equal to a minimum operating voltage of the internal chip of the auxiliary power supply circuit, and the third threshold is less than the first threshold, and the current source turn-off circuit is configured to: when the current source circuit starts up the auxiliary power supply circuit, control the current source circuit to stop charging the internal chip of the auxiliary power supply circuit.

According to a second aspect, the present disclosure provides an inverter, where the inverter may include a bus capacitor, an inverter circuit, an auxiliary power supply circuit, and the control apparatus that is provided in the first aspect, where a voltage across the bus capacitor is a bus voltage, and the bus capacitor is powered by a PV battery, the bus voltage is used to supply power to the auxiliary power supply circuit and the inverter circuit, and the auxiliary power supply circuit is configured to supply auxiliary power to the inverter circuit, and the control apparatus is configured to, when the bus voltage is greater than or equal to a first threshold, control the bus capacitor to short-circuit so that the PV battery stops charging the bus capacitor, to make the bus voltage drop, and when the bus voltage is less than or equal to a second threshold, stop controlling the bus capacitor to short-circuit so that the PV battery continues to charge the bus capacitor, to make the bus voltage rise, where the first threshold is greater than the second threshold, the first threshold is less than or equal to a maximum operating voltage that is allowed by an internal component of the inverter, and the second threshold is greater than or equal to a minimum operating voltage of the auxiliary power supply circuit.

In a first possible implementation manner of the second aspect, the control apparatus is further configured to, when the bus voltage is greater than or equal to a third threshold, charge an internal chip of the auxiliary power supply circuit, to reach an operating voltage of the internal chip of the auxiliary power supply circuit, to further start up the auxiliary power supply circuit, and the control apparatus is further configured to, after the auxiliary power supply circuit is started up, stop charging the internal chip of the auxiliary power supply circuit.

According to a third aspect, the present disclosure provides an inverter system, where the inverter system may include a PV battery and the inverter that is provided in the second aspect, where the PV battery is configured to supply power to the inverter.

According to a fourth aspect, the present disclosure provides a method for controlling an inverter, where the method may include detecting a bus voltage of the inverter, where the bus voltage refers to a voltage across a bus capacitor and the bus capacitor is powered by a PV battery, and when the bus voltage is greater than or equal to a first threshold, controlling the PV battery to short-circuit so that the PV battery stops supplying power to the bus capacitor to make the bus voltage drop, and when the bus voltage drops to a second threshold, stopping controlling the PV battery to short-circuit so that the PV battery continues to supply power to the bus capacitor, to make the bus voltage rise, where the first threshold is greater than the second threshold, the first threshold is less than a maximum operating voltage that is allowed by an internal component of the inverter, and the second threshold is greater than or equal to a minimum operating voltage of an auxiliary power supply circuit of the inverter.

In a first possible implementation manner of the fourth aspect, the method further includes, when the bus voltage is greater than or equal to a third threshold, charging an internal chip of the auxiliary power supply circuit, to reach an operating voltage of the internal chip of the auxiliary power supply circuit, to further start up the auxiliary power supply circuit, where the third threshold is greater than or equal to a minimum operating voltage of the internal chip of the auxiliary power supply circuit, and the third threshold is less than the first threshold, and after the auxiliary power supply circuit is started up, the method further includes stopping charging the internal chip of the auxiliary power supply circuit.

It can be seen from the foregoing technical solutions that the embodiments of the present disclosure have the following advantages.

In the embodiments of the present disclosure, when it is detected that a voltage across a bus capacitor, for example, a bus voltage, is excessively large, a PV battery is controlled to short-circuit. After the PV battery is short-circuited, the PV battery cannot charge the bus capacitor. After the PV battery stops charging, energy stored in the bus capacitor is gradually consumed by a load so that the bus voltage drops. When the bus voltage drops to a particular value, the PV battery continues to charge the bus capacitor, to control the bus voltage to rise. The foregoing overvoltage protection control is repeated so that the bus voltage can be kept within an operating voltage range of an inverter and the inverter in this embodiment of the present disclosure can be equipped with a PV battery having a higher open circuit voltage. Therefore, a charging rate of the bus capacitor can be increased, a time taken to start up an auxiliary power supply circuit of the inverter and an inverter circuit of the inverter is reduced, and a startup speed of the inverter is increased.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person skilled in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments of the present disclosure described herein can, for example, be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Embodiments of the present disclosure provide a control apparatus applied to an inverter, which may increase a startup speed of the inverter. The embodiments of the present disclosure further provide a corresponding method for controlling an inverter, a related inverter, and an inverter system. The following separately gives a detailed description by using specific embodiments.

The control apparatus provided in the embodiments of the present disclosure may be applied to a PV inverter ("inverter" for short below). The inverter is powered by a PV battery.

Figure 1:
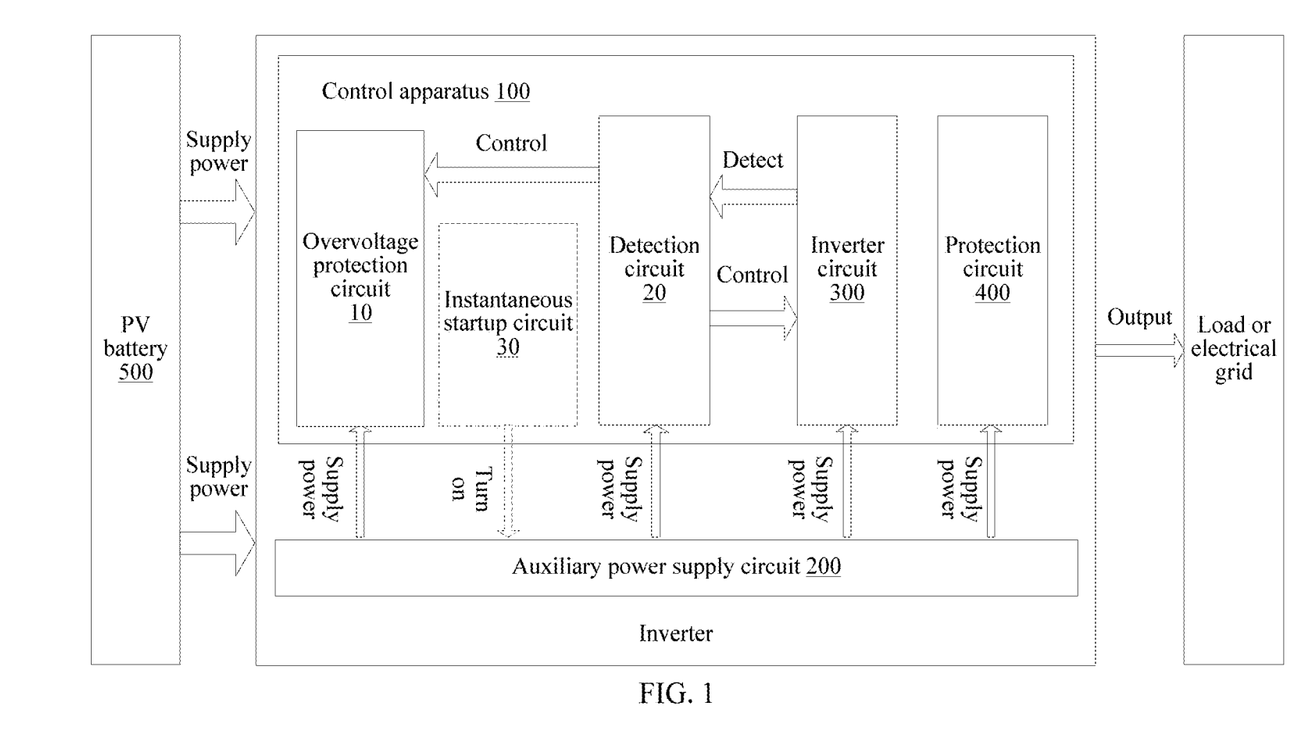
FIG. 1 is a schematic structural diagram of a control apparatus applied to an inverter according to an embodiment of the present disclosure.

The control apparatus 100 applied to an inverter provided in the embodiments of the present disclosure may include an overvoltage protection circuit 10 and a detection circuit 20. The inverter may include at least an auxiliary power supply circuit 200, an inverter circuit 300, and a protection circuit 400. For specific details, reference may be made to FIG. 1. FIG. 1 is a schematic structural diagram of a control apparatus 100 applied to an inverter according to an embodiment of the present disclosure. It should be noted that a PV battery 500, the auxiliary power supply circuit 200, the inverter circuit 300, the protection circuit 400, and a load that are in FIG. 1 are all provided to help describe the control apparatus 100 and do not cause any limitation to the present disclosure.

The auxiliary power supply circuit 200 may be configured to supply auxiliary power to the inverter circuit 300, and the protection circuit 400 may be configured to protect the inverter when the inverter is abnormal. The PV battery 500 supplies power to the inverter by charging a bus capacitor of the inverter, where a voltage across the bus capacitor is a bus voltage, and the bus voltage is used to supply power to the auxiliary power supply circuit 200 of the inverter, the inverter circuit 300 of the inverter, and the protection circuit 400 of the inverter.

In addition, the auxiliary power supply circuit 200 may be further configured to supply auxiliary power to the overvoltage protection circuit 10, the detection circuit 20, and the protection circuit 400. For example, the auxiliary power supply circuit 200 may provide a drive voltage to the inverter circuit 300, the overvoltage protection circuit 10, the detection circuit 20, and the protection circuit 400 so that the inverter circuit 300, the overvoltage protection circuit 10, the detection circuit 20, and the protection circuit 400 can work normally or be started up.

The detection circuit 20 is configured to detect the bus voltage of the inverter and input the detected bus voltage to the overvoltage protection circuit 10.

The overvoltage protection circuit 10 is configured to receive the bus voltage input by the detection circuit 20 and, when the bus voltage is greater than or equal to a first threshold, control the PV battery 500 to short-circuit so that the PV battery 500 stops supplying power to the bus capacitor to make the bus voltage drop, and when the bus voltage drops to a second threshold, stop controlling the PV battery 500 to short-circuit so that the PV battery 500 continues to supply power to the bus capacitor to make the bus voltage rise, where the first threshold is greater than the second threshold, the first threshold is less than or equal to a maximum operating voltage that is allowed by an internal component of the inverter, and the second threshold is greater than or equal to a minimum operating voltage of the auxiliary power supply circuit 200.

It should be noted that the first threshold is related to the maximum operating voltage that is allowed by each component of the inverter. The first threshold is less than or equal to the maximum operating voltage that is allowed by the internal component of the inverter so that a low-voltage component of the inverter is not damaged. For example, if the maximum operating voltage that is allowed by the inverter is a maximum operating voltage that is allowed by the inverter circuit 300 of the inverter, the first threshold is a minimum operating voltage of the inverter circuit 300. The second threshold is a minimum voltage ensuring that the inverter works normally. The auxiliary power supply circuit 200 is configured to ensure that the inverter circuit 300 and the like of the inverter can work normally. Therefore, the second threshold is greater than or equal to a minimum operating voltage of the auxiliary power supply circuit 200 so that components such as the inverter circuit of the inverter can work normally. The first threshold is greater than the second threshold.

It can be known from the above that in this embodiment of the present disclosure, when it is detected that a voltage across the bus capacitor, for example, the bus voltage, is excessively large, so that a low-voltage component of the inverter can work normally, the PV battery is controlled to short-circuit. After the PV battery is short-circuited, the PV battery cannot charge the bus capacitor. After the PV battery stops charging, energy stored in the bus capacitor is gradually consumed by the load. Therefore, the bus voltage drops. When the bus voltage drops to a particular value, so that each component of the inverter can work normally, the PV battery continues to charge the bus capacitor so as to control the bus voltage to rise so that the bus voltage can be kept within an operating voltage range of the inverter. The foregoing overvoltage protection control is repeated until each parameter of the inverter satisfies a preset index value so that the inverter can transmit power to an electrical grid or the load. Therefore, the inverter in this embodiment of the present disclosure can be equipped with a PV battery having a higher open circuit voltage, which can increase a charging rate of the bus capacitor and further reduce a time taken to start up the auxiliary power supply circuit of the inverter and the inverter circuit of the inverter so that the inverter can be started up rapidly.

Figure 2:
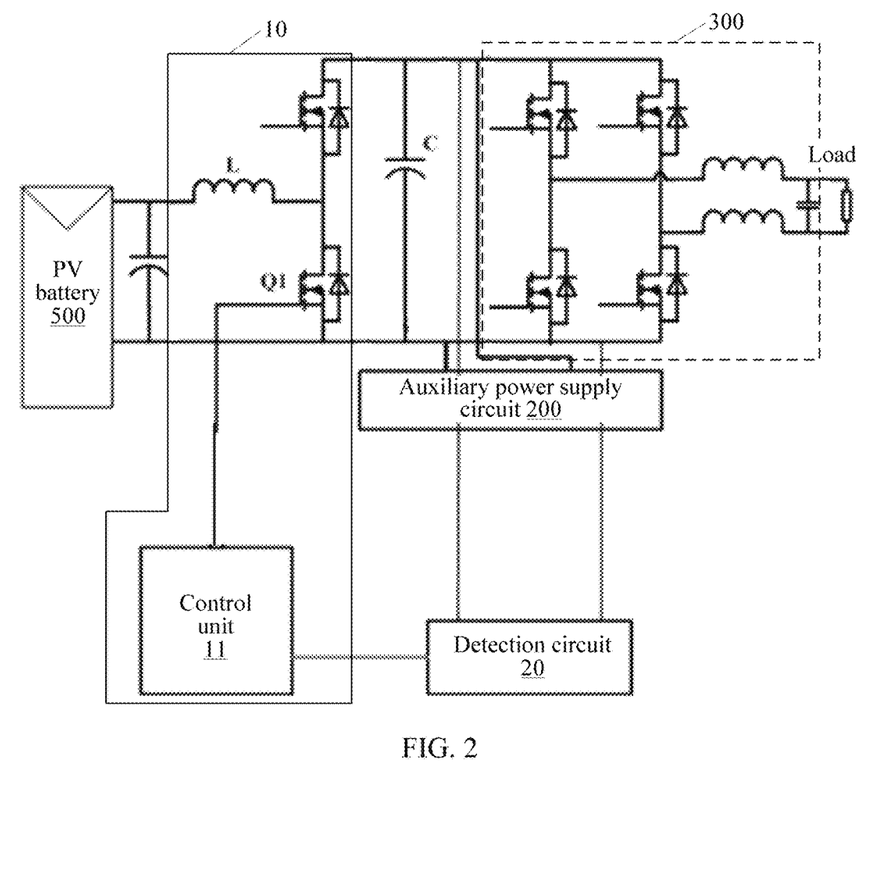
FIG. 2 is a schematic structural diagram of a circuit of a control apparatus applied to an inverter according to an embodiment of the present disclosure.

Further, reference may also be made to FIG. 2. FIG. 2 is a schematic structural diagram of a circuit of a control apparatus applied to an inverter according to an embodiment of the present disclosure. It should be noted that a bus capacitor C, a PV battery 500, an auxiliary power supply circuit 200, an inverter circuit 300, and a load that are in FIG. 2 are all provided to help describe the control apparatus and do not cause any limitation to the present disclosure.

This embodiment of the present disclosure includes an overvoltage protection circuit 10 and a detection circuit 20, where the overvoltage protection circuit 10 may include a switch Q1 and a control unit 11, a first connection end and a second connection end of Q1 are respectively connected to two ends of the PV battery 500, and a third connection end of Q1 is connected to the control unit 11.

The control unit 11 is configured to receive a bus voltage input by the detection circuit 20 and, when the bus voltage is greater than or equal to a first threshold, control Q1 to be closed so as to control the PV battery 500 to short-circuit so that the PV battery 500 stops supplying power to the bus capacitor C to make the bus voltage drop, and when the bus voltage drops to a second threshold, control Q1 to be opened so as to stop controlling the PV battery 500 to short-circuit so that the PV battery 500 continues to supply power to the bus capacitor C and the bus voltage is controlled to rise.

It can be understood that Q1 may be a switching transistor and the control unit 11 may be a complex programmable logical device (CPLD), a digital signal processor (DSP), or the like.

Figure 3:
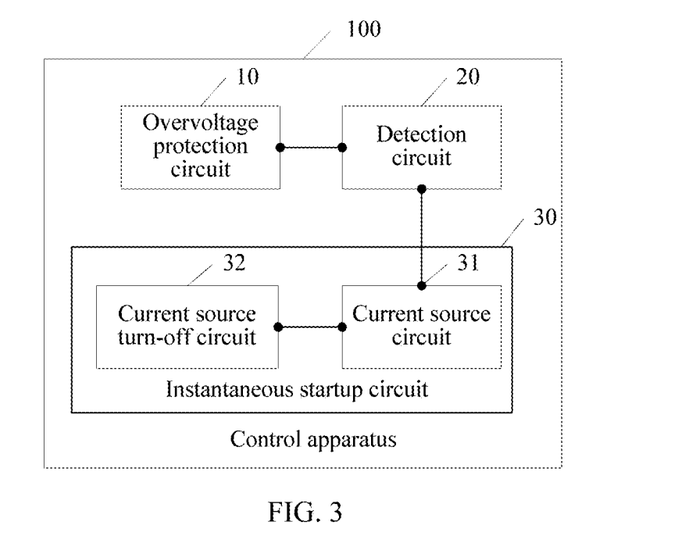
FIG. 3 is another schematic structural diagram of a control apparatus applied to an inverter according to an embodiment of the present disclosure.

Reference may also be made to FIG. 3. FIG. 3 is another schematic structural diagram of a control apparatus applied to an inverter according the present disclosure.

Further, to improve stability of an inverter, the control apparatus may further include an instantaneous startup circuit 30 configured to instantaneously start up an auxiliary power supply circuit 200. It should be noted that the auxiliary power supply circuit 200 may supply auxiliary power to an inverter circuit 300, an overvoltage protection circuit 10, a detection circuit 20, and a protection circuit 400, to ensure that the inverter circuit 300, the overvoltage protection circuit 10, the detection circuit 20, and the protection circuit 400 can work normally or be started up.

The instantaneous startup circuit 30 may receive a bus voltage detected by the detection circuit 20 or a bus voltage detected by the instantaneous startup circuit 30 and instantaneously start up the auxiliary power supply 200 according to the bus voltage detected by the detection circuit 20 or the bus voltage detected by the instantaneous startup circuit 30.

In an implementation manner, the instantaneous startup circuit 30 may receive the bus voltage detected by the detection circuit 20 and instantaneously start up the auxiliary power supply 200 according to the bus voltage detected by the detection circuit 20. Referring to FIG. 3, the instantaneous startup circuit 30 may include a current source circuit 31 and a current source turn-off circuit 32.

The detection circuit 20 may detect a bus voltage of an inverter, and input the detected bus voltage to the current source circuit 31.

The current source circuit 31 may receive the bus voltage input by the detection circuit 20 and, when the bus voltage is greater than or equal to a third threshold, start the current source circuit 31 so that the current source circuit 31 charges an internal chip of the auxiliary power supply circuit 200 to reach an operating voltage of the internal chip of the auxiliary power supply circuit 200 to further start up the auxiliary power supply circuit 200, where the third threshold is greater than or equal to a minimum operating voltage of the internal chip of the auxiliary power supply circuit 200 and the third threshold is less than a first threshold.

The current source turn-off circuit 32 is configured to, after the current source circuit 31 starts up the auxiliary power supply circuit 200, control the current source circuit 31 to stop charging the internal chip of the auxiliary power supply circuit 200.

Figure 4:
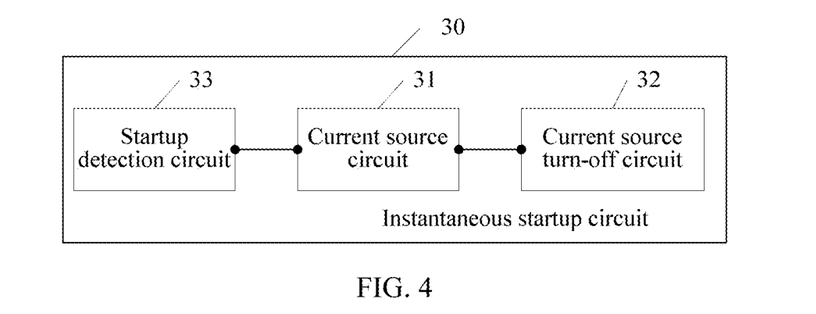
FIG. 4 is a schematic structural diagram of an instantaneous startup circuit according to an embodiment of the present disclosure.

In another implementation manner, the instantaneous startup circuit 30 may detect the bus voltage and instantaneously start up the auxiliary power supply 200 according to the bus voltage detected by the instantaneous startup circuit 30. Referring to FIG. 4, FIG. 4 is a schematic structural diagram of an instantaneous startup circuit. The instantaneous startup circuit 30 may include a current source circuit 31, a current source turn-off circuit 32, and a startup detection circuit 33.

The startup detection circuit 33 is configured to detect a bus voltage of an inverter and input the bus voltage to the current source circuit 31.

The current source circuit 31 is configured to receive the bus voltage input by the startup detection circuit 33 and, when the bus voltage is greater than or equal to a third threshold, start the current source circuit 31 so that the current source circuit 31 charges an internal chip of an auxiliary power supply circuit 200 to reach an operating voltage of the internal chip of the auxiliary power supply circuit 200 to further start up the auxiliary power supply circuit 200, where the third threshold is greater than or equal to a minimum operating voltage of the internal chip of the auxiliary power supply circuit 200, and the third threshold is less than a first threshold.

The current source turn-off circuit 32 is configured to, after the current source circuit 31 starts up the auxiliary power supply circuit 200, control the current source circuit 31 to stop charging the internal chip of the auxiliary power supply circuit 200.

In this embodiment of the present disclosure, the internal chip of the auxiliary power supply circuit 200 is charged by the current source circuit 31. Compared with the prior art in which the internal chip of the auxiliary power supply circuit 200 is charged by connecting a large resistor using a bus, in this embodiment of the present disclosure, the operating voltage of the internal chip of the auxiliary power supply circuit 200 can be reached more rapidly, thereby instantaneously starting up the auxiliary power supply circuit 200 and improving reliability and stability of the inverter.

To better understand the foregoing solutions, the following gives a detailed description of this embodiment of the present disclosure by using specific embodiments. For example, a specific implementation of the overvoltage protection circuit is as follows.

Figure 5A:
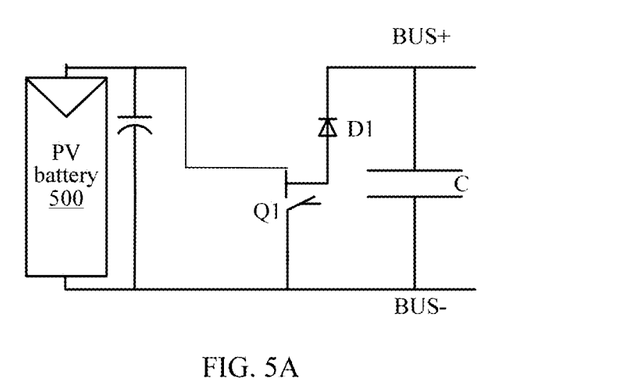
FIG. 5A to FIG. 5C are schematic structural diagrams of a circuit of an overvoltage protection circuit according to an embodiment of the present disclosure.

Referring to FIG. 5a, FIG. 5a is a schematic structural diagram of a circuit of an overvoltage protection circuit. The overvoltage protection circuit 10 may further include a diode D1, where a positive end of D1 is connected to Q1 and a negative end of D1 is connected to a positive end of a bus capacitor C. When Q1 is closed, Q1 can be prevented from short-circuiting the bus capacitor C by using D1.

Figure 5B:
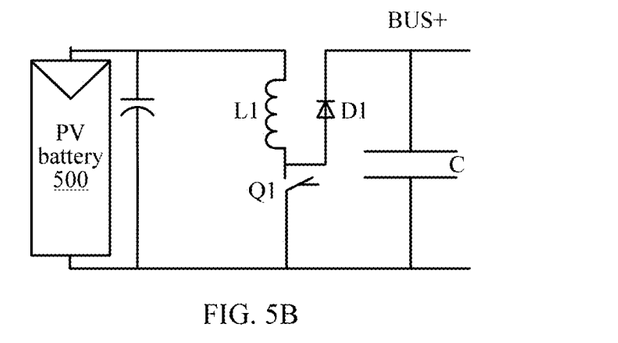

Referring to FIG. 5b, FIG. 5b is a schematic structural diagram of another circuit of an overvoltage protection circuit. The overvoltage protection circuit may further include a diode D1 and an inductor L1, where L1 and Q1 are connected in series and are connected to two ends of a PV battery 500, a positive end of D1 is connected to a common connection point between L1 and Q1, and a negative end of D1 is connected to a positive end of a bus capacitor C. When Q1 is opened, energy stored in L1 may be released to the bus capacitor C through D1 so as to charge the bus capacitor C. When Q1 is closed, a rise rate of a bus voltage may be limited by L1 and Q1 can be prevented from short-circuiting the bus capacitor C by using D1.

Figure 5C:
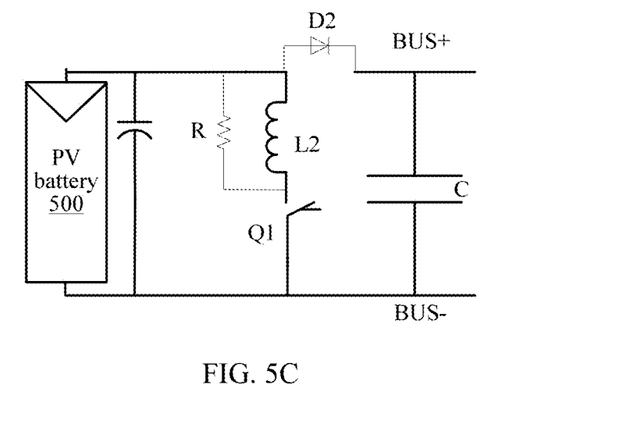

Referring to FIG. 5c, FIG. 5c is a schematic structural diagram of another circuit of an overvoltage protection circuit. The overvoltage protection circuit may further include a diode D2, an inductor L2, and a resistor R, where L2 and Q1 are connected in series and are connected to two ends of a PV battery 500, R is connected in parallel to L2, a positive end of D2 is connected to a common connection point between R and L2, and a negative end of D2 is connected to a positive end of a bus capacitor C. When Q1 is opened, energy stored in L2 may be released to the bus capacitor C through D2 or R so as to charge the bus capacitor C. When Q1 is closed, a rise rate of a bus voltage may be limited by L2 and Q1 can be prevented from short-circuiting the bus capacitor C by using D2.

D2 and L2 that are in FIG. 5c and D1 and L1 that are in FIG. 5b or FIG. 5a have same functions. Different subscripts are merely used to distinguish similar subjects, and do not cause any limitation to the present disclosure.

Figure 6:
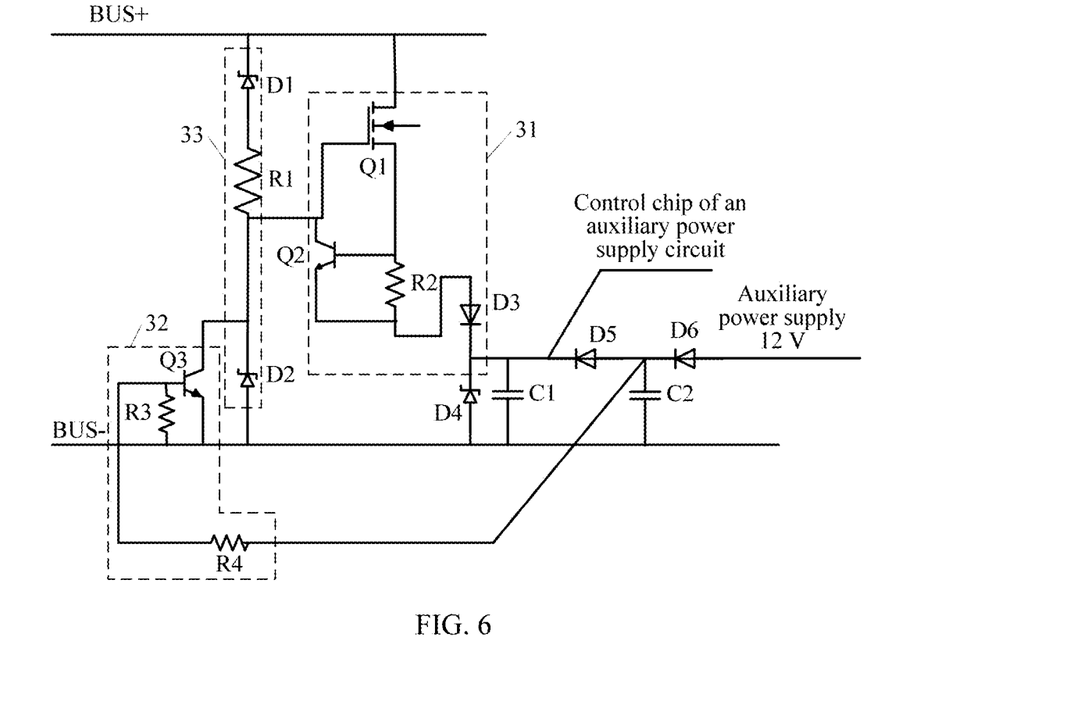
FIG. 6 is a schematic structural diagram of a circuit of an instantaneous startup circuit according to an embodiment of the present disclosure.

Referring to FIG. 6, FIG. 6 is a schematic diagram of a circuit of an instantaneous startup circuit. The instantaneous startup circuit 30 may include a current source circuit 31, a current source turn-off circuit 32, and a startup detection circuit 33, where the startup detection circuit 33 may include D1, R1, and D2, the current source circuit 31 may include Q1, Q2, R2, and D3, and the current source turn-off circuit 32 may include R4, R3, and Q3.

The startup detection circuit 33 detects a bus voltage of an inverter. The current source circuit 31 obtains the bus voltage detected by the startup detection circuit 33. After the bus voltage is greater than or equal to a third threshold, a voltage allocated to D2 is sufficient enough to start the current source circuit 31. After the current source circuit 31 is started up, the current source circuit 31 rapidly charges a capacitor C1, to charge an internal chip of an auxiliary power supply circuit. When a voltage value of C1 is greater than or equal to an operating voltage of the internal chip of the auxiliary power supply circuit, starts up the auxiliary power supply circuit. For example, if the operating voltage of the internal chip of the auxiliary power supply circuit is 12 volts (V), in a process of starting up the auxiliary power supply circuit, 12 V is output and established through winding so that Q3 in the current source turn-off circuit 32 is closed and the current source circuit 31 is controlled to stop charging C1 so as to stop charging the internal chip of the auxiliary power supply circuit, thereby implementing that the auxiliary power supply circuit 200 is started up instantaneously.

Figure 7A:
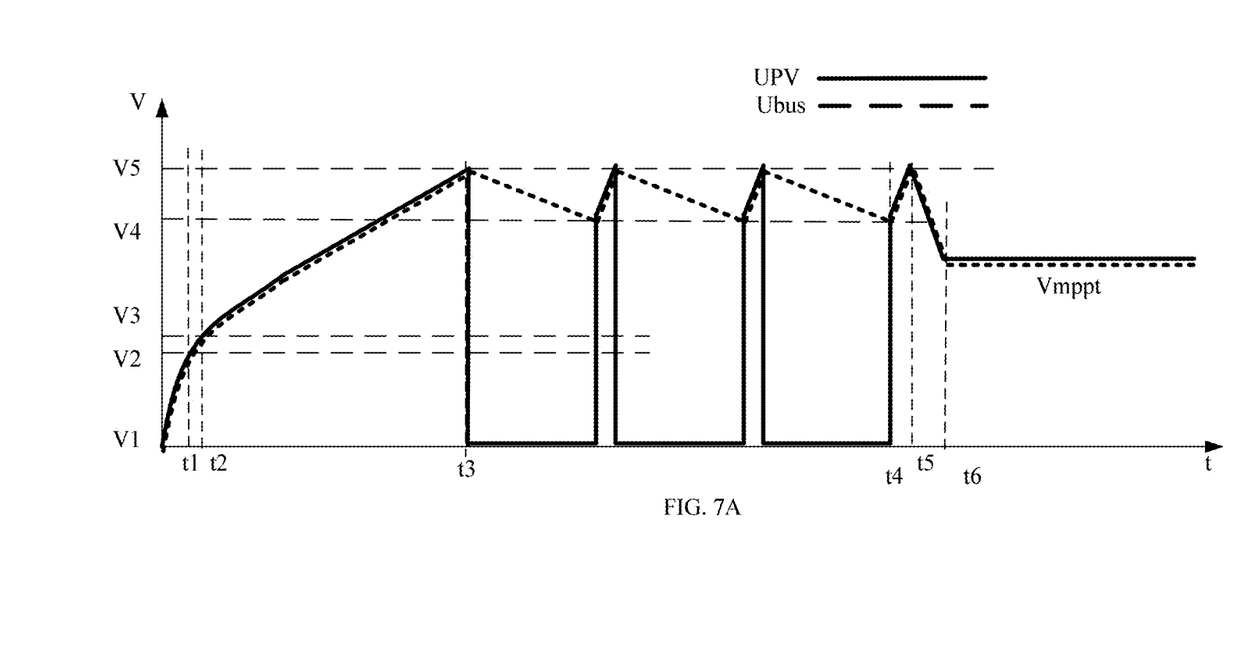
FIG. 7A and FIG. 7B are curves of change in a bus voltage according to an embodiment of the present disclosure.
Figure 7B:
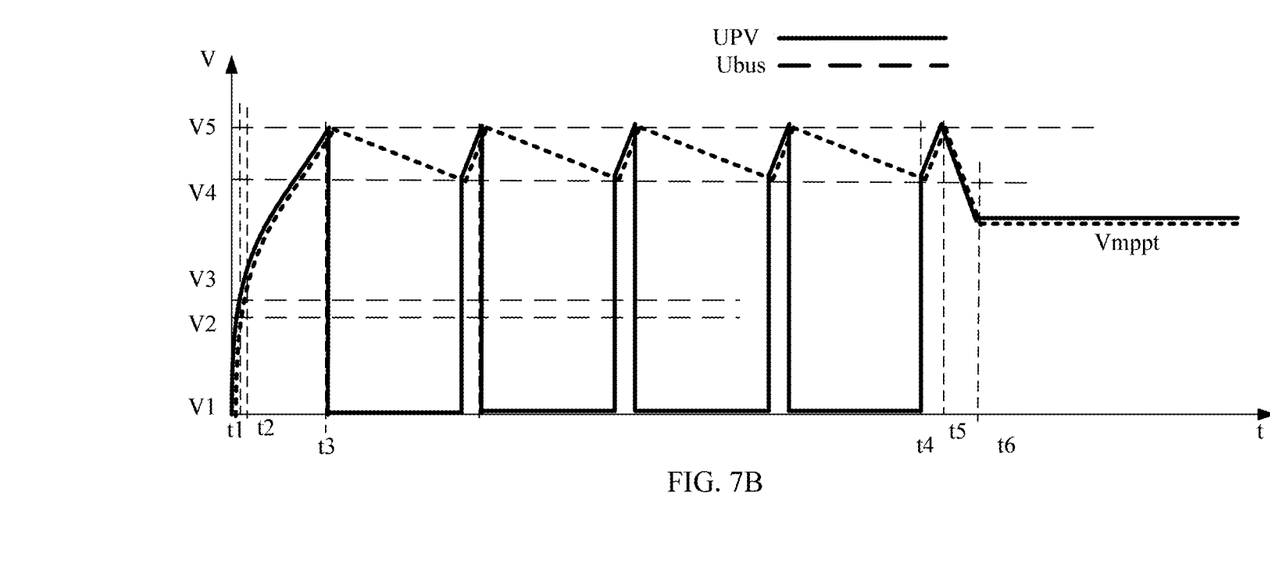

To better understand the technical solutions of the present disclosure, the following gives a detailed description of the present disclosure by using specific application examples. Referring to FIG. 7a or FIG. 7b, FIG. 7a is a curve of change in a bus voltage when an inverter is naturally started up in the morning, and FIG. 7b is another curve of change in a bus voltage when an inverter is started up under a high voltage.

Referring to FIG. 7a, FIG. 7a uses an example in which the inverter is naturally started up in the morning for detailed description. When the inverter is naturally started up in the morning, illumination gradually becomes strong, and a voltage Upv of a PV battery gradually rises. When Upv rises to V2, an auxiliary power supply circuit is instantaneously started up. After the auxiliary power supply circuit is started up, Upv continues rising. When Upv rises to a first threshold V5, an overvoltage protection circuit controls a bus voltage Ubus to drop. When Ubus drops to a second threshold V4, the overvoltage protection circuit controls Ubus to rise. The protection process is repeated N times in a process of t3 to t4, to provide overvoltage protection to self-detection of the inverter. It can be understood that in FIG. 7a, Upv is represented by a solid line, and Ubus is represented by a dotted line, where at a location in which Upv and Ubus overlap each other, to clearly label Upv and Ubus, the Ubus line is moved down, which does not cause any limitation to the present disclosure.

It is easy to understand that in the process of t3 to t4, at the same time of overvoltage protection, the inverter can perform and execute self-detection. The self-detection of the inverter mainly includes detecting whether parameters of the inverter satisfy preset index values. If the parameters of the inverter satisfy the preset index values, the inverter may transmit power to an electrical grid or a load. It is assumed that the self-detection is completed at a moment t5, a voltage Vmppt is output, and the inverter is successfully started up. It should be noted that for a specific implementation of the self-detection and output that are of the inverter, reference may be made to the prior art. Details are not described herein.

Referring to FIG. 7b, FIG. 7b uses an example in which the inverter is started up under a high voltage for detailed description. When the inverter is started up under a high voltage (for example, being connected at a moment having the strongest light at noon), at a connecting moment when a PV battery is connected to the inverter, an open circuit voltage of the PV battery is extremely high. At the connecting moment, a PV voltage is dragged down around Ubus, and then Ubus rises rapidly. When Ubus reaches V2, the auxiliary power supply circuit is instantaneously started up. Subsequent steps are similar to a case of the natural startup in the morning. For example, after the auxiliary power supply circuit is started up, Upv continues rising. When Upv rises to a first threshold V5, an overvoltage protection circuit controls Ubus to drop. When Ubus drops to a second threshold V4, the overvoltage protection circuit controls Ubus to rise. The protection process is repeated N times in a process of t3 to t4.

The control apparatus in this embodiment of the present disclosure can ensure that the bus voltage can be kept within an operating voltage range of the inverter so that the inverter can be equipped with a PV battery having a higher open circuit voltage, which can increase a charging rate of the bus capacitor, further reduce a time taken to start up the auxiliary power supply circuit of the inverter and the inverter circuit of the inverter, and increase a startup speed of the inverter.

To facilitate a better understanding of this embodiment of the present disclosure, the present disclosure further provides an inverter. For specific details, reference may be made to FIG. 1, and reference may also be made to FIG. 2 to FIG. 7b.

An inverter may include a bus capacitor C, an inverter circuit 300, an auxiliary power supply circuit 200, and a control apparatus 100, where a voltage across the bus capacitor C is a bus voltage and the bus capacitor C is powered by a PV battery. The bus voltage is used to supply power to the auxiliary power supply circuit 200 and the inverter circuit 300, the auxiliary power supply circuit 200 is configured to supply auxiliary power to the inverter circuit 300. In addition, the bus voltage may further supply auxiliary power to a protection circuit 400 and the control apparatus 100. The control apparatus 100 is configured to, when the bus voltage is greater than or equal to a first threshold, control the bus capacitor C to short-circuit so that the PV battery 500 stops charging the bus capacitor C, to make the bus voltage drop and, when the bus voltage is less than or equal to a second threshold, stop controlling the bus capacitor to short-circuit so that the PV battery continues to charge the bus capacitor C to make the bus voltage rise, where the first threshold is greater than the second threshold, the first threshold is less than or equal to a maximum operating voltage that is allowed by an internal component of the inverter, and the second threshold is greater than or equal to a minimum operating voltage of the auxiliary power supply circuit 200.

The control apparatus 100 is further configured to, when the bus voltage is greater than or equal to a third threshold, charge an internal chip of the auxiliary power supply circuit 200 to reach an operating voltage of the internal chip of the auxiliary power supply circuit 200 to further start up the auxiliary power supply circuit. The control apparatus 100 is further configured to, after the auxiliary power supply circuit 200 is started up, stop charging the internal chip of the auxiliary power supply circuit 200.

It should be noted that for a specific implementation of the control apparatus 100, reference may be made to the foregoing embodiment. Details are not described herein again.

To facilitate a better understanding of this embodiment of the present disclosure, the present disclosure further provides an inverter system. For specific details, reference may be made to FIG. 1, and reference may also be made to FIG. 2 to FIG. 7b.

An inverter system may mainly include a PV battery 500 and an inverter, where the PV battery 500 is configured to supply power to the inverter. For a specific implementation the inverter, reference may be made to the foregoing embodiment. Details are not described herein again.

To facilitate a better implementation of the control apparatus applied to an inverter provided in this embodiment of the present disclosure, this embodiment of the present disclosure further provides a method based on the foregoing control apparatus applied to an inverter, where the meanings of the nouns are the same as those in the foregoing control apparatus applied to an inverter, and for specific implementation details, reference may be made to the description in the method embodiments.

Figure 8:
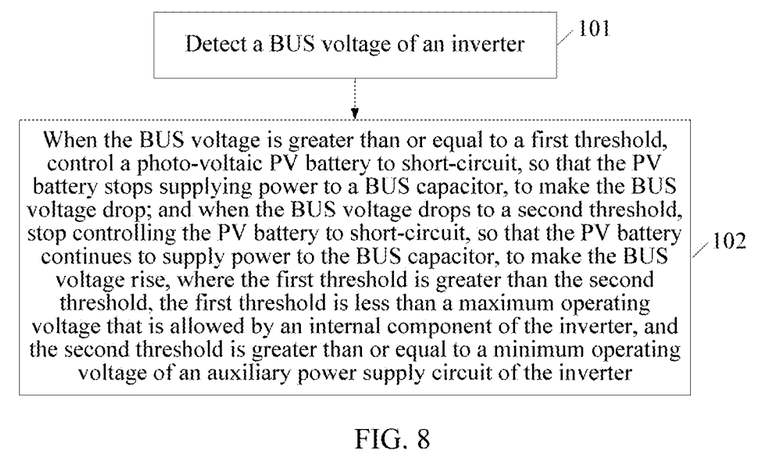
FIG. 8 is a schematic flowchart of a method for controlling an inverter according to an embodiment of the present disclosure.

Referring to FIG. 8, FIG. 8 is a schematic flowchart of a method for controlling an inverter according to an embodiment of the present disclosure, where the method for controlling an inverter may include:

Step 101: Detect a bus voltage of an inverter.

The bus voltage refers to a voltage across a bus capacitor, the bus voltage is used to supply power to each component of the inverter, and the bus capacitor is powered by a PV battery.

Step 102: When the bus voltage is greater than or equal to a first threshold, control a PV battery to short-circuit so that the PV battery stops supplying power to a bus capacitor to make the bus voltage drop. When the bus voltage drops to a second threshold, stop controlling the PV battery to short-circuit so that the PV battery continues to supply power to the bus capacitor to make the bus voltage rise, where the first threshold is greater than the second threshold, the first threshold is less than a maximum operating voltage that is allowed by an internal component of the inverter, and the second threshold is greater than or equal to a minimum operating voltage of an auxiliary power supply circuit of the inverter.

It should be noted that the first threshold is related to the maximum operating voltage that is allowed by each component of the inverter. The first threshold is less than or equal to the maximum operating voltage that is allowed by the internal component of the inverter so that a low-voltage component of the inverter is not damaged. For example, if the maximum operating voltage that is allowed by the inverter is a maximum operating voltage that is allowed by an inverter circuit of the inverter, the first threshold is a minimum operating voltage of the inverter circuit. The second threshold is a minimum voltage ensuring that the inverter works normally. The auxiliary power supply circuit is configured to ensure that the inverter circuit of the inverter can work normally. Therefore, the second threshold is greater than or equal to a minimum operating voltage of the auxiliary power supply circuit so that components such as the inverter circuit of the inverter can work normally. The first threshold is greater than the second threshold.

The PV battery may be controlled to short-circuit by controlling a switching transistor Q1 to be closed. For example, the switching transistor Q1 may be controlled to be opened to stop controlling the PV battery to short-circuit, where two connection ends of Q1 are respectively connected to two ends of the PV battery.

Further, this embodiment of the present disclosure may further include the following steps. When the bus voltage is greater than or equal to a third threshold, charging an internal chip of the auxiliary power supply circuit to reach an operating voltage of the internal chip of the auxiliary power supply circuit to further start up the auxiliary power supply circuit, where the third threshold is greater than or equal to a minimum operating voltage of the internal chip of the auxiliary power supply circuit, and the third threshold is less than the first threshold. After the auxiliary power supply circuit is started up, this embodiment of the present disclosure further includes stopping charging the internal chip of the auxiliary power supply circuit.

It should be noted that for a specific implementation of this embodiment, reference may be made to the foregoing embodiments. Details are not described herein again.

In the foregoing embodiments, the description of each embodiment has respective focuses. For a part that is not described in detail in an embodiment, reference may be made to related descriptions in other embodiments.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The inverter, the control apparatus thereof, the method for controlling same, and the inverter system that are provided by the present disclosure are described above in detail. In this specification, specific examples are used to describe the principle and implementation manners of the present disclosure, and the description of the foregoing embodiments is only intended to help understand the method and core idea of the present disclosure. Meanwhile, a person skilled in the art may, based on the idea of the present disclosure, make modifications with respect to the specific implementation manners and the application scope. Therefore, the content of this specification shall not be construed as a limitation to the present disclosure.

What is claimed is:

1. A control apparatus applied to an inverter, comprising:
   an overvoltage protection circuit; and
   a detection circuit configured to:
   detect a bus voltage of the inverter; and
   input the detected bus voltage to the overvoltage protection circuit,
   wherein the bus voltage refers to a voltage across a bus capacitor,
   wherein the bus voltage supplies power to an auxiliary power supply circuit of the inverter and an inverter circuit of the inverter,
   wherein the auxiliary power supply circuit is configured to supply auxiliary power to the inverter circuit,
   wherein the bus capacitor is powered by a photo-voltaic (PV) battery,
   wherein the overvoltage protection circuit is coupled to the detection circuit and configured to:
   receive the bus voltage input by the detection circuit;
   control the PV battery to short-circuit such that the PV battery stops supplying power to the bus capacitor to make the bus voltage drop when the bus voltage is greater than or equal to a first threshold; and
   stop controlling the PV battery to short-circuit such that the PV battery continues to supply power to the bus capacitor to make the bus voltage rise when the bus voltage drops to a second threshold,
   wherein the first threshold is greater than the second threshold,
   wherein the first threshold is less than or equal to a maximum operating voltage that is allowed by an internal component of the inverter,
   wherein the second threshold is greater than or equal to a minimum operating voltage of the auxiliary power supply circuit,
   wherein the overvoltage protection circuit comprises a switch (Q1) and a processor,
   wherein a first connection end and a second connection end of Q1 are respectively connected to two ends of the PV battery,
   wherein a third connection end of Q1 is connected to the processor, and
   wherein the processor is configured to:
   receive the bus voltage input by the detection circuit;
   control Q1 to be closed to control the PV battery to short-circuit such that the PV battery stops supplying power to the bus capacitor to make the bus voltage drop when the bus voltage is greater than or equal to the first threshold; and
   control Q1 to be opened to stop controlling the PV battery to short-circuit such that the PV battery continues to supply power to the bus capacitor to make the bus voltage rise when the bus voltage drops to the second threshold.

2. The control apparatus according to claim 1, wherein the overvoltage protection circuit further comprises a diode (D1), wherein a positive end of D1 is connected to Q1, wherein a negative end of D1 is connected to a positive end of the bus capacitor, and wherein D1 is configured to prevent Q1 from short-circuiting the bus capacitor when Q1 is closed.

3. The control apparatus according to claim 1, wherein the overvoltage protection circuit further comprises:
   a diode (D2);
   an inductor (L2); and
   a resistor (R),
   wherein L2 and Q1 are connected in series and to the two ends of the PV battery,
   wherein R is connected in parallel to L2,
   wherein a positive end of D2 is connected to a common connection point between R and L2, wherein a negative end of D2 is connected to a positive end of the bus capacitor, wherein D2 is configured to prevent Q1 from short-circuiting the bus capacitor when Q1 is closed, wherein L2 is configured to limit a rise rate of the bus voltage when Q1 is closed, and wherein R is configured to absorb energy stored in L2 when Q1 is opened.

4. The control apparatus according to claim 2, wherein the overvoltage protection circuit further comprises an inductor (L1), wherein L1 and Q1 are connected in series and to the two ends of the PV battery, wherein L1 is configured to limit a rise rate of the bus voltage when Q1 is closed, wherein the positive end of D1 is connected to a common connection point between L1 and Q1, and wherein the negative end of D1 is connected to the positive end of the bus capacitor.

5. A control apparatus applied to an inverter, comprising:
an overvoltage protection circuit; and
a detection circuit configured to:
    detect a bus voltage of the inverter; and
    input the detected bus voltage to the overvoltage protection circuit,
wherein the bus voltage refers to a voltage across a bus capacitor,
wherein the bus voltage supplies power to an auxiliary power supply circuit of the inverter and an inverter circuit of the inverter,
wherein the auxiliary power supply circuit is configured to supply auxiliary power to the inverter circuit,
wherein the bus capacitor is powered by a photo-voltaic (PV) battery,
wherein the overvoltage protection circuit is coupled to the detection circuit and configured to:
    receive the bus voltage input by the detection circuit;
    control the PV battery to short-circuit such that the PV battery stops supplying power to the bus capacitor to make the bus voltage drop when the bus voltage is greater than or equal to a first threshold; and
    stop controlling the PV battery to short-circuit such that the PV battery continues to supply power to the bus capacitor to make the bus voltage rise when the bus voltage drops to a second threshold,
wherein the first threshold is greater than the second threshold,
wherein the first threshold is less than or equal to a maximum operating voltage that is allowed by an internal component of the inverter,
wherein the second threshold is greater than or equal to a minimum operating voltage of the auxiliary power supply circuit,
wherein the control apparatus further comprises an instantaneous startup circuit,
wherein the instantaneous startup circuit comprises:
    a startup detection circuit;
    a current source circuit; and
    a current source turn-off circuit,
wherein the startup detection circuit is configured to detect the bus voltage of the inverter and input the bus voltage to the current source circuit,
wherein the current source circuit is configured to:
    receive the bus voltage input by the startup detection circuit; and
    start the current source circuit such that the current source circuit charges an internal chip of the auxiliary power supply circuit to reach an operating voltage of the internal chip of the auxiliary power supply circuit to further start up the auxiliary power supply circuit when the bus voltage is greater than or equal to a third threshold,
wherein the third threshold is greater than or equal to a minimum operating voltage of the internal chip of the auxiliary power supply circuit,
wherein the third threshold is less than the first threshold, and
wherein the current source turn-off circuit is configured to current source circuit control the current source circuit to stop charging the internal chip of the auxiliary power supply circuit when the current source circuit starts up the auxiliary power supply circuit.

6. An inverter system, comprising:
a bus capacitor;
an inverter circuit;
an auxiliary power supply circuit; and
a control apparatus,
wherein a voltage across the bus capacitor is a bus voltage,
wherein the bus capacitor is powered by a photo-voltaic (PV) battery,
wherein the bus voltage supplies power to the auxiliary power supply circuit and the inverter circuit,
wherein the auxiliary power supply circuit is configured to supply auxiliary power to the inverter circuit,
wherein the control apparatus is configured to:
    control the bus capacitor to short-circuit such that the PV battery stops charging the bus capacitor to make the bus voltage drop when the bus voltage is greater than or equal to a first threshold; and
    stop controlling the bus capacitor to short-circuit such that the PV battery continues to charge the bus capacitor to make the bus voltage rise when the bus voltage is less than or equal to a second threshold,
wherein the first threshold is greater than the second threshold,
wherein the first threshold is less than or equal to a maximum operating voltage that is allowed by an internal component of the inverter,
wherein the second threshold is greater than or equal to a minimum operating voltage of the auxiliary power supply circuit, and
wherein the control apparatus is further configured to:
    charge an internal chip of the auxiliary power supply circuit to reach an operating voltage of the internal chip of the auxiliary power supply circuit to further start up the auxiliary power supply circuit when the bus voltage is greater than or equal to a third threshold; and
    stop charging the internal chip of the auxiliary power supply circuit after the auxiliary power supply circuit is started up.

7. The inverter system according to claim 6, wherein the control apparatus comprises:
an overvoltage protection circuit; and
a detection circuit configured to:
    detect the bus voltage; and
    input the detected bus voltage to the overvoltage protection circuit, and
wherein the overvoltage protection circuit is coupled to the detection circuit and configured to:
    receive the bus voltage input by the detection circuit;
    control the PV battery to short-circuit such that the PV battery stops supplying power to the bus capacitor to make the bus voltage drop when the bus voltage is greater than or equal to a first threshold; and stop controlling the PV battery to short-circuit such that the PV battery continues to supply power to the bus capacitor to make the bus voltage rise when the bus voltage drops to a second threshold.

8. The inverter system of claim 6, further comprising the PV battery, wherein the PV battery is configured to supply power to the bus capacitor, the inverter circuit, the auxiliary power supply circuit, and the control apparatus.

9. An inverter system, comprising:
a bus capacitor;
an inverter circuit;
an auxiliary power supply circuit; and
a control apparatus,
wherein a voltage across the bus capacitor is a bus voltage,
wherein the bus capacitor is powered by a photo-voltaic (PV) battery,
wherein the bus voltage supplies power to the auxiliary power supply circuit and the inverter circuit,
wherein the auxiliary power supply circuit is configured to supply auxiliary power to the inverter circuit,
wherein the control apparatus is configured to:
control the bus capacitor to short-circuit such that the PV battery stops charging the bus capacitor to make the bus voltage drop when the bus voltage is greater than or equal to a first threshold; and
stop controlling the bus capacitor to short-circuit such that the PV battery continues to charge the bus capacitor to make the bus voltage rise when the bus voltage is less than or equal to a second threshold,
wherein the first threshold is greater than the second threshold,
wherein the first threshold is less than or equal to a maximum operating voltage that is allowed by an internal component of the inverter,
wherein the second threshold is greater than or equal to a minimum operating voltage of the auxiliary power supply circuit, and
wherein the inverter system further comprises the PV battery,
wherein the PV battery is configured to supply power to the bus capacitor, the inverter circuit, the auxiliary power supply circuit, and the control apparatus, and
wherein the inverter system is further configured to:
charge an internal chip of the auxiliary power supply circuit to reach an operating voltage of the internal chip of the auxiliary power supply circuit to further start up the auxiliary power supply circuit when the bus voltage is greater than or equal to a third threshold, wherein the third threshold is greater than or equal to a minimum operating voltage of the internal chip of the auxiliary power supply circuit, and wherein the third threshold is less than the first threshold; and
stop charging the internal chip of the auxiliary power supply circuit after the auxiliary power supply circuit is started up.

* * * * *